(12) United States Patent
Rao et al.

(10) Patent No.: US 7,662,741 B2
(45) Date of Patent: Feb. 16, 2010

(54) PROCESS FOR PREPARING SILVER DEPOSITED CARBON COVERED ALUMINA CATALYST

(75) Inventors: Kamaraju Sheetha Rama Rao, Andhra Pradesh (IN); Bussi David Raju, Andhra Pradesh (IN); Aytam Hari Padmasri, Andhra Pradesh (IN); Sivakumar Vasireddy, Andhra Pradesh (IN); Naga Ratnakar Adapa, Andhra Pradesh (IN); Seetharamulu Podila, Andhra Pradesh (IN); Shashikala Veldurthi, Andhra Pradesh (IN); Mallanna Nagaraja Bhari, Andhra Pradesh (IN); Sanapureddy Sreevardhan Reddy, Andhra Pradesh (IN); Ponnapalli Nageswara Sarma, Andhra Pradesh (IN); Katuri Krishna Prasad, Andhra Pradesh (IN); Reddy Venkata Mohan Srinivasula, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 336 days.

(21) Appl. No.: 11/396,240

(22) Filed: Mar. 31, 2006

(65) Prior Publication Data

US 2006/0254989 A1    Nov. 16, 2006

(30) Foreign Application Priority Data

Mar. 31, 2005   (IN) .................. 0795/DEL/2005

(51) Int. Cl.
| | | |
|---|---|---|
| B01J 21/18 | (2006.01) | |
| B01J 23/00 | (2006.01) | |
| B01J 23/48 | (2006.01) | |
| B01J 23/50 | (2006.01) | |
| C02F 1/68 | (2006.01) | |
| B05D 1/36 | (2006.01) | |
| B05D 7/00 | (2006.01) | |
| B05D 3/02 | (2006.01) | |
| C23C 16/00 | (2006.01) | |
| B32B 5/16 | (2006.01) | |
| B32B 9/00 | (2006.01) | |
| B32B 15/02 | (2006.01) | |
| B32B 17/02 | (2006.01) | |
| B32B 19/00 | (2006.01) | |
| B32B 21/02 | (2006.01) | |
| B32B 23/02 | (2006.01) | |
| B32B 27/02 | (2006.01) | |

(52) U.S. Cl. ............... 502/184; 502/182; 502/348; 210/764; 427/125; 427/404; 427/122; 427/228; 427/249.1; 427/250; 428/403

(58) Field of Classification Search .......... 502/182, 502/184, 348; 210/764; 427/125, 404, 122, 427/228, 249.1, 250; 428/403
See application file for complete search history.

(56) References Cited

U.S. PATENT DOCUMENTS

| 3,291,753 | A | * | 12/1966 | Thompson ............... 502/101 |
|---|---|---|---|---|
| 3,492,093 | A | * | 1/1970 | Seglin et al. ............ 423/579 |
| 3,658,724 | A | * | 4/1972 | Stiles .................... 502/183 |
| 3,758,418 | A | * | 9/1973 | Leonard, Jr. et al. ...... 502/348 |
| 3,964,933 | A | * | 6/1976 | Fung et al. ............. 429/231.8 |
| 4,353,741 | A | * | 10/1982 | Capuano et al. .......... 549/534 |
| 4,772,578 | A | * | 9/1988 | Bowman ................ 502/244 |
| 5,037,791 | A | * | 8/1991 | Comolli et al. .......... 502/185 |
| 5,196,380 | A | * | 3/1993 | Shadman ................ 502/4 |
| 5,488,023 | A | * | 1/1996 | Gadkaree et al. ......... 502/182 |
| 5,998,328 | A | * | 12/1999 | Dawes et al. ........... 502/182 |

FOREIGN PATENT DOCUMENTS

DE         198 19 396    * 11/1999

* cited by examiner

Primary Examiner—Patricia L Hailey
(74) Attorney, Agent, or Firm—Ladas & Parry LLP

(57) ABSTRACT

The present invention relates to a process for the preparation of highly active silver deposited on carbon covered alumina catalyst, in controlling the microorganism in water.

7 Claims, No Drawings

PROCESS FOR PREPARING SILVER DEPOSITED CARBON COVERED ALUMINA CATALYST

FIELD OF THE INVENTION

The present invention relates to a process for the preparation of highly active silver deposited on carbon covered alumina catalyst, in controlling the microorganism in water.

BACKGROUND OF THE INVENTION

While water is an essential element for survival of living organisms, most diseases spread due to poor water quality, particularly due to the presence of bacteria and viruses in the water. Hence it is utmost important to purify the water before its use. There are several methods of water purification like chlorination, iodation, ozonation, UV-purification reverse osmosis and silver ions. Chemical purification like addition of chlorine, iodine or ozone has several disadvantages. For example, excess chlorination leads to cancer. Other methods like UV-purification and reverse osmosis are not cost effective. Ever since silver has been recognized as an antibactericide, its application in purification of water is increasing.

U.S. Pat. No. 4,608,247 discloses the use of silver in water purification wherein silver micro crystals on $\alpha$-$Al_2O_3$ with a copper sheath surrounding it has a capability of Ag and Cu to leach into a swimming pool by galvanic action without application of electric current. U.S. Pat. No. 6,758,345 discloses treatment medium comprising silver deposited on to an alumina substrate useful for controlling microorganism in water effectively. Another US patent discloses silver and a second metal say Pd co-deposited on alumina as an effective catalyst in controlling the microorganism in water. Copending Indian patent application 1055/DEL/03 discloses a process of making silver on activated carbon by in-situ deposition using low voltage current for controlling microorganism in water.

The main drawbacks of the prior art patents is that alumina various impurities in water on contact for a long time because of its acidic character and also activated carbon is not a high strength material. Moreover in activated carbon the micro pores are not accessible for depositing silver ions. However both these supports alumina and carbon have advantages like high mechanical strength possessed by alumina and high inertness of carbon towards various impurities present in water. Also carbon is known to be deodorizer and decolorizing agent.

OBJECTS OF THE INVENTION

The main object of the present invention is to utilize the combined characteristics of alumina and carbon as a support by depositing silver on carbon covered alumina.

Another object of the invention is to provide a process wherein the silver content in the catalyst is in the range of 0.1 to 10 weight percent preferably 1 to 5 weight percent Another object of the invention is to provide a process for controlling the microorganism present in water.

SUMMARY OF THE INVENTION

The present invention provides a process for the preparation of silver deposited on carbon covered alumina and its ability in controlling the microorganism in water.

DETAILED DESCRIPTION OF THE INVENTION

The inventors herein have found that both silver deposited on carbon and silver deposited on alumina are effective in controlling microorganisms in water. The present invention therefore provides a process for the utilization of the combined characteristics of alumina and carbon in the form of carbon covered alumina, which acts as a support for silver and the ability of the material in controlling the microorganism in water.

In one embodiment, the present invention relates to a process for making a carbon covered alumina support with silver deposited thereon.

In another embodiment of the invention, the silver content in the catalyst is in the range of 0.1 to 10 weight percent preferably in the range of 1 to 5 weight percent.

Another embodiment of the present invention is a process wherein the ability of silver deposited on carbon-covered alumina in controlling microorganism in water is disclosed.

Scientific Explanation

Micro crystals of silver have a tendency to lightly bound nascent oxygen (with a binding energy of only 40 kcal/mol) and these species readily oxidizes bacteria or viruses, resulting in complete disintegration.

Among all the metals, silver is unique in its affinity towards oxygen. It is reported that atomic oxygen had an almost perfect fit in the octahedral holes of gold, silver and copper. However, in gold the electron cloud of oxygen tends to be expelled by lattice oxygen of gold atoms and this blocks movement through holes. Copper forms oxide providing an impossible barrier. Silver offers so little repulsion to oxygen that only a small amount of thermal energy is required to readily move the atomic oxygen through the silver lattice.

The atomic oxygen adsorbed on to the surface of silver exposed to aqueous media readily reacts with pairs of sulfhydril (—S—H) groups on the surface of the bacteria or viruses by replacing the hydrogen atoms (as water) resulting in the coupling of the sulfur atoms to form —R—S—S—R— bond which completely blocks the respiration process and electron transfer. Monovalent silver ions have an affinity for sulfhydril groups exposed on bacteria or viruses.

The combined characteristics of carbon covered alumina can be achieved by making carbon covered alumina by a standard procedure ie., by pyrolysis of hydrocarbon on alumina. Even though the carbon thus deposited on alumina is pyrolytic in nature it covers most of the surface acidic sites of alumina (Ref: Applied Catalysis A: General, 83 (1992) 141). Moreover, the carbon coverage on alumina prevents alumina to contact with the impurities present in water.

Silver can be deposited on carbon-covered alumina by standard impregnation technique or by electrodeposition method.

Raw water that is to be analysed is taken and it is serially diluted in a series of test tubes. From each test tube 0.1 ml of the water is taken and is spread on the petri-plates using a spreader containing solidified nutrient agar and are incubated at 37° C. for 24 h. This entire process is done in the laminar airflow. The number of colonies grown are then counted after incubation. The ability of the catalyst in controlling microorganism in water is done after vigorous stirring of about 50 ml of raw water with the catalyst taken and filtering off the catalyst followed by the above procedure to get the number of colonies.

Nutrient agar solution is prepared by dissolving 28 g. in 1000 ml of distilled water and is autoclaved at a pressure of 15 lbs for around 15 min. Then after cooling it is distributed in 36 petri-plates with 5 ml in each petri-plate and left for solidification.

Saline water is prepared by dissolving 2.88 g of NaCl in 300 ml of distilled water. This saline solution is distributed in 30 test tubes with each one containing 9 ml of it, covered with cotton plugs and autoclaved at a pressure of 15 lbs for 15 min. They are then cooled and inoculated with 0.1 ml of the inoculated culture and the mixture is spread on the agar petri-plates for quantification of microorganisms.

The present invention is described with reference to the following examples that are explained by way of illustration and should not be construed as limiting the present invention.

EXAMPLE-1

To 10 ml aqueous solution containing 158 mg of silver nitrate, 5 g. of dried Carbon covered alumina is added separately and kept for stirring for 1 hour followed by removing the excess water by evaporating on a hot plate with stirring and drying in a hot air over for over night. The dried samples are then reduced in a flow of hydrogen at 250° C. for 3 h. The catalyst sample thus prepared contains 2 weight percent of silver and is denoted as Ag-CCA (I).

EXAMPLE-2

5 g of carbon-covered alumina has been immersed in 2 lit. distilled water and silver nano-particles are generated by passing a 40 V DC power through a pair of silver electrodes (0.4 mm thickness and 10 mm width and 150 mm long plates) while maintaining a constant rapid stirring for 10 h. The water is evaporated to dryness on a hot plate with stirring and the resultant catalyst is dried in an air oven for over night. The resultant catalyst contains 2 weight percent of silver and is denoted as Ag-CCA (EC).

EXAMPLE-3

To a 50 ml of water containing coliforms, Ag-CCA(I) catalyst as mentioned in example-1, is added and stirred well for 1 h, followed by filtration to remove the catalyst particles. 1 ml of the filtrate water that is to be analysed is taken in a test tube containing 9 ml of saline water and it is serially diluted in a series of 6 test tubes each containing 9 ml of saline water. Similarly, 1 ml of the raw water is taken in the first test tube containing 9 ml of saline solution and from it 1 ml is taken into the second test tube also containing 9 ml of saline solution. This process is repeated to 6 times from each test tube, 0.1 ml of the water is taken and is spread on the petri-plates using a spreader containing solidified nutrient agar and are incubated at 37° C. for 24 h. This entire process is done in the laminar airflow. The number of colonies grown is then counted after incubation. The ability of Ag-CCA (I) in controlling the microorganism is shown in Table-1.

TABLE 1

Performance of Ag-CCA(I) catalyst in controlling microorganism in water

| S. No. | Catalyst | Wt. of catalyst (in g) | Bacterial count (CFU/ml) |
|---|---|---|---|
| 1 | Raw water (without catalyst) | — | $7 \times 10^7$ |
| 2 | Ag-CCA(I) | 0.1 | $2 \times 10^7$ |
| 3 | Ag-CCA(I) | 0.2 | $6 \times 10^4$ |
| 4 | Ag-CCA(I) | 0.5 | $3 \times 10^2$ |

EXAMPLE-4

To a 50 ml of water containing coliforms, Ag-CCA(EC) catalyst, as mentioned in example-2 is added and stirred well for 1 h, followed by filtration to remove the catalyst particles. 1 ml of the filtrate water that is to be analysed is taken in a test tube containing 9 ml of saline water and it is serially diluted in a series of 6 test tubes each containing 9 ml of saline water. Similarly, 1 ml of the raw water is taken in the first test tube containing 9 ml of saline solution and from it 1 ml is taken into the second test tube also containing 9 ml of saline solution. This process is repeated to 6 times. From each test tube 0.1 ml of the water is taken and is spread on the petri-plates using a spreader containing solidified nutrient agar and are incubated at 37° C. for 24 h. This entire process is done in the laminar airflow. The number of colonies grown is then counted after incubation. The number of colonies grown is then counted after incubation. The ability of Ag-CCA(EC) in controlling the microorganism is shown in Table-2.

TABLE 2

Performance of Ag-CCA(EC) catalyst in controlling microorganism in water

| S. No. | Catalyst | Wt. of catalyst (in g) | Bacterial count (CFU/ml) |
|---|---|---|---|
| 1 | Raw water (without catalyst) | — | $7 \times 10^7$ |
| 2 | Ag-CCA (EC) | 0.1 | $1 \times 10^3$ |
| 3 | Ag-CCA (EC) | 0.2 | $31 \times 10^2$ |
| 4 | Ag-CCA (EC) | 0.5 | Nil |

We claim:

1. A process for the preparation of silver deposited carbon covered alumina catalyst comprising forming a carbon covered alumina catalyst and depositing silver thereon to form the silver deposited carbon covered alumina catalyst, wherein the silver is deposited on the carbon covered alumina by electrodeposition.

2. A process as claimed in claim 1, wherein the silver content in the catalyst is in the range of 0.1 to 10 weight percent.

3. A process comprising forming a carbon covered alumina catalyst and depositing silver thereon to form a silver deposited carbon covered alumina catalyst, wherein the silver is deposited on the carbon covered alumina by electrodeposition or by an impregnation process consisting of (i) adding the carbon covered alumina to an aqueous solution of a compound containing the silver that results in impregnation of the carbon covered alumina catalyst with silver, (ii) removing excess solution from the impregnated catalyst, (iii) drying the impregnated catalyst and then, optionally, (iv) reducing the impregnated catalyst, the process further comprising the reduction of microorganisms in water by subjecting water to treatment with the silver deposited carbon covered alumina catalyst.

4. A process as claimed in claim 3, wherein the carbon covered alumina catalyst is obtained by pyrolysis of hydrocarbon on alumina.

5. A process as claimed in claim 3, wherein the silver content in the catalyst is in the range of 0.1 to 10 weight percent.

6. A process according to claim 3, wherein the silver is deposited on the carbon covered alumina by the impregnation process.

7. A process according to claim 6, wherein the impregnated catalyst is reduced in a flow of hydrogen.

* * * * *